(12) United States Patent
Voelz (10) Patent No.: US 9,221,094 B2
(45) Date of Patent: Dec. 29, 2015

(54) DEVICE FOR PROVIDING AND CONTROLLING MOTION OF CONNECTION ELEMENTS

(75) Inventor: Mathias Voelz, Oldenburg (DE)

(73) Assignee: BROETJE AUTOMATION GMBH, Wiefelstede (DE)

( * ) Notice: Subject to any disclaimer, the term of this patent is extended or adjusted under 35 U.S.C. 154(b) by 717 days.

(21) Appl. No.: 13/295,571

(22) Filed: Nov. 14, 2011

(65) Prior Publication Data

US 2012/0138657 A1  Jun. 7, 2012

(30) Foreign Application Priority Data

Dec. 3, 2010 (DE) .......................... 10 2010 053 219

(51) Int. Cl.
| | |
|---|---|
| *B27F 7/13* | (2006.01) |
| *B21J 15/28* | (2006.01) |
| *B21J 15/32* | (2006.01) |
| *B21J 15/26* | (2006.01) |
| *B23P 19/00* | (2006.01) |

(52) U.S. Cl.
CPC ............... *B21J 15/32* (2013.01); *B23P 19/004* (2013.01)

(58) Field of Classification Search
CPC ............. B25C 5/02; B21J 15/28; B21J 15/32; B21J 15/12; B27F 7/13; B23P 19/004; B65G 51/02
USPC ........... 227/112; 221/278; 222/253, 254, 504, 222/505, 506, 507, 508, 509, 252, 267, 266, 222/265, 282, 284, 283, 305; 406/73, 151, 406/153, 194
See application file for complete search history.

(56) References Cited

U.S. PATENT DOCUMENTS

| | | | |
|---|---|---|---|
| 4,463,889 A | 8/1984 | Sartran | |
| 4,662,206 A | 5/1987 | Mauer et al. | |
| 5,385,434 A * | 1/1995 | Quinn et al. | ..................... 406/73 |
| 5,472,087 A | 12/1995 | Rink et al. | |
| 6,575,347 B2 * | 6/2003 | Coonrod et al. | .............. 227/112 |
| 6,951,298 B1 * | 10/2005 | Cogley et al. | .................. 227/147 |
| 7,882,981 B2 | 2/2011 | Auriol et al. | |
| 2005/0006427 A1 | 1/2005 | Bloch et al. | |
| 2005/0284827 A1 | 12/2005 | Auriol et al. | |
| 2008/0245809 A1 | 10/2008 | Fustel I Gascon | |

FOREIGN PATENT DOCUMENTS

| | | |
|---|---|---|
| DE | 3112520 | 10/1982 |
| DE | 3444025 | 6/1986 |
| DE | 102006031465 | 1/2008 |
| EP | 0 691 177 | 1/1996 |
| EP | 1 531 966 | 5/2005 |
| FR | 2 842 181 | 1/2004 |
| JP | 54-102669 | 8/1979 |
| WO | 00/47350 | 8/2000 |

* cited by examiner

*Primary Examiner* — Andrew M Tecco
*Assistant Examiner* — Praachi M Pathak
(74) *Attorney, Agent, or Firm* — Michael J. Striker (57) ABSTRACT

A connection elements control for motion control of connection elements such as rivet elements or the like has at least one control unit with connection elements channel through which the connection elements are pushed, possibly by a fluid flow, the connection elements channel having an inlet section and an outlet section, and a control shaft extending through at least a portion of the connection elements channel in a control region between the sections, and the system is designed such that the passage of the connection elements and/or fluid through control region is controlled by swiveling control shaft.

21 Claims, 7 Drawing Sheets

DEVICE FOR PROVIDING AND CONTROLLING MOTION OF CONNECTION ELEMENTS

CROSS REFERENCE TO RELATED APPLICATIONS

The invention described and claimed hereinbelow is also described in German Patent Application DE 10 2010 053 219.3 filed on Dec. 3, 2010. This German Patent Application, whose subject matter is incorporated here by reference, provides the basis for a claim of priority of invention under 35 U.S.C. 119(a)-(d). Further, the content of the present application is related to the content of U.S. application Ser. No. 13/290,258, filed Nov. 7, 2011 and U.S. application Ser. No. 13/290,306, filed Nov. 7, 2011.

BACKGROUND OF THE INVENTION

The present invention relates to a device for controlling motion of connection elements such as rivets and the like, and to a device for providing the connection elements.

Rivet connections have played an important role for many years in the aviation industry in particular. The automation of riveting applications is becoming increasingly significant since aircraft components are becoming increasingly larger.

In addition to carrying out riveting applications using rivet tools, providing rivet elements specifically and rapidly via related motion control poses a particular challenge to system manufacturers.

A known device for providing rivets (EP 1 531 966 B1) is equipped with a rivet storage unit designed as a cartridge cabinet comprising a number of rivet cartridges stacked one above the other. Using a transfer carriage which can be moved along the rivet cartridges, rivet elements are transferred from the particular rivet cartridge that has arrived to a rivet outlet.

The known device for providing rivets is equipped regularly with a rivet control which performs motion control, in particular the receipt and forwarding of rivet elements that were transferred. The rivet control is usually based on the triggering of a number of locking slides, which always results in a structurally complex system overall.

SUMMARY OF THE INVENTION

Accordingly, it is an object of the present invention to provide a control device for connection elements such as rivets or the like, and a device for providing connection elements, which were further improvements of the existing devices.

The problem addressed by the invention is that of providing a connection element control that permits effective motion control of connection elements such as rivets and the like, in a structurally simple manner.

An essential aspect of the present invention is the premise that particularly effective motion control of rivet elements can be achieved using a system in which a control shaft extends through at least a part of a rivet channel in such a way that the passage of rivet elements and/or fluid through the control region can be controlled by swiveling the control shaft.

The use of a control shaft is advantageous in many ways in the present case. Given that the control shaft needs only to be designed to pivot, expensive linear guides that are susceptible to interference can be omitted.

Furthermore, numerous possibilities for motion control with low structural complexity can be achieved by designing the control shaft accordingly.

Finally, it is advantageous that the rivet control via a control shaft enables one common control shaft to be used for a plurality of rivet control units. It is therefore possible to omit separate control actuators for the rivet control units.

In a variant of the present invention, the control shaft comprises a rivet channel pass-through bore which, depending on the position of the control shaft, establishes a connection section between the inlet section and the outlet section of the rivet channel, or blocks the passage of rivet elements and/or fluid. Such a pass-through bore is easily attained using production engineering.

Furthermore preferably, the control shaft can be also equipped with a fluid channel pass-through bore, via which a transport fluid flow can be generated to forward the rivet elements to the rivet application, in particular when the control shaft is situated in the blocking position. The integration of such a transport function into the rivet control results in a particularly compact design overall.

According to a further feature of the invention which is likewise significant in and of itself, a device for providing connection elements is proposed.

The device for providing connection elements such as rivets and the like according to the further teaching is equipped with a rivet storage unit designed as a cartridge cabinet, which comprises at least two stacked rivet cartridges. To transfer rivet elements from the rivet cartridges, a transfer carriage is provided which can be moved in the stacking direction of the rivet cartridges.

To implement the motion control of the rivet elements to be transferred, the transfer carriage is equipped with an above-described rivet control having a control shaft. The transfer, in particular the receipt and forwarding of the rivet elements to be transferred, can therefore be implemented in a manner having a particularly simple design.

The invention is explained below in greater detail with reference to a drawing that depicts only one embodiment. In the drawing:

DESCRIPTION OF THE PREFERRED EMBODIMENTS

The device for providing connection elements, in particular rivets R depicted in the drawing is used to automatically provide rivet elements 1 or the like. The term "rivet element" has broad meaning and includes all possible connection elements designed similar to rivets in any possible manner.

When used as intended, rivet elements 1 stored in the device for providing rivets R are transferred to a rivet control, are received by the rivet control, and are forwarded to the particular rivet application.

The rivet control is particularly significant in regard to the function of the device for providing rivets R. Basically it can also be used in any other application, such as in combination with shaker conveyors or the like. The explanation of the rivet control proceeds from this background.

The rivet control serves very generally as the motion control of rivet elements 1 or the like. The motion control of rivet elements 1 comprises active driving of rivet elements 1 and passive blocking or release of rivet elements 1. In the context of an above-described device for providing rivets R, the rivet control preferably has the function of receiving and forwarding rivet elements 1, as will be shown. The term "motion control" therefore also has broad meaning.

Figure 3:
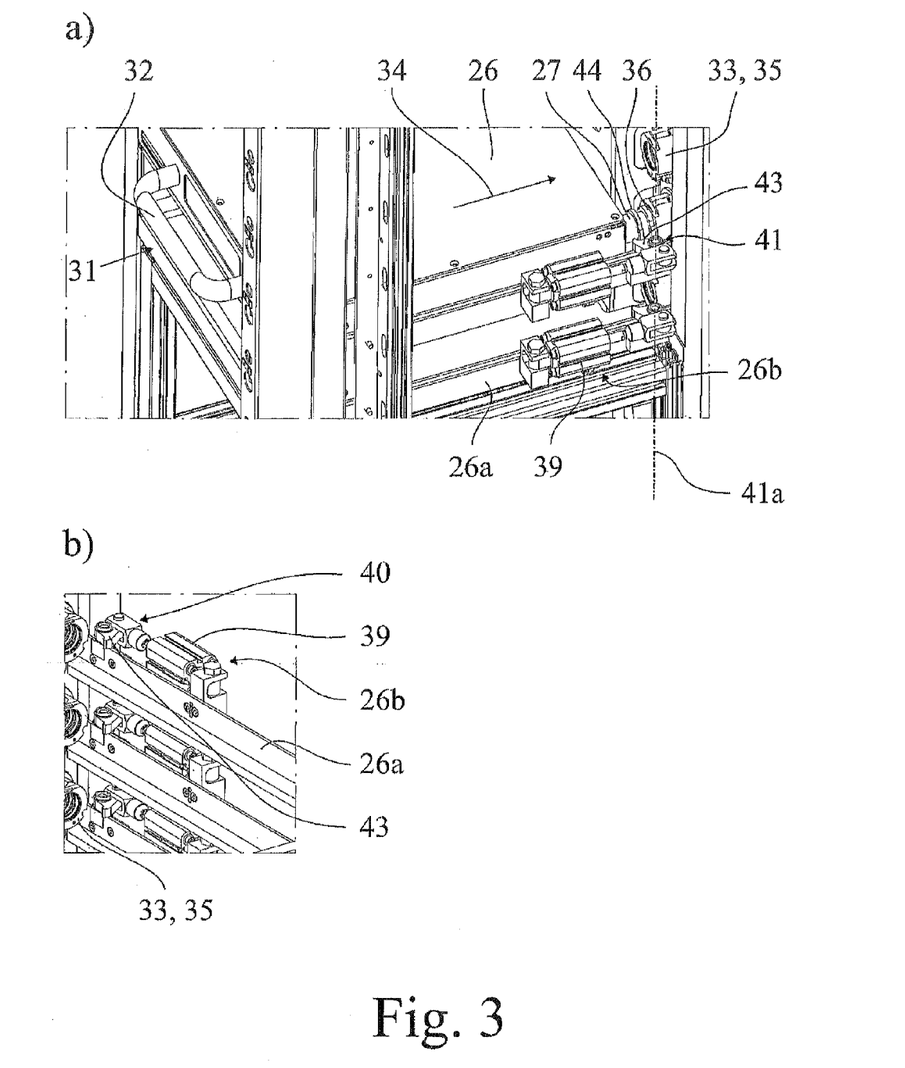
FIG. 3 shows the cartridge locks of the device for providing rivets according to FIG. 1 a) in the locked state and b) in the unlocked state, both in a perspective view.
Figure 4:
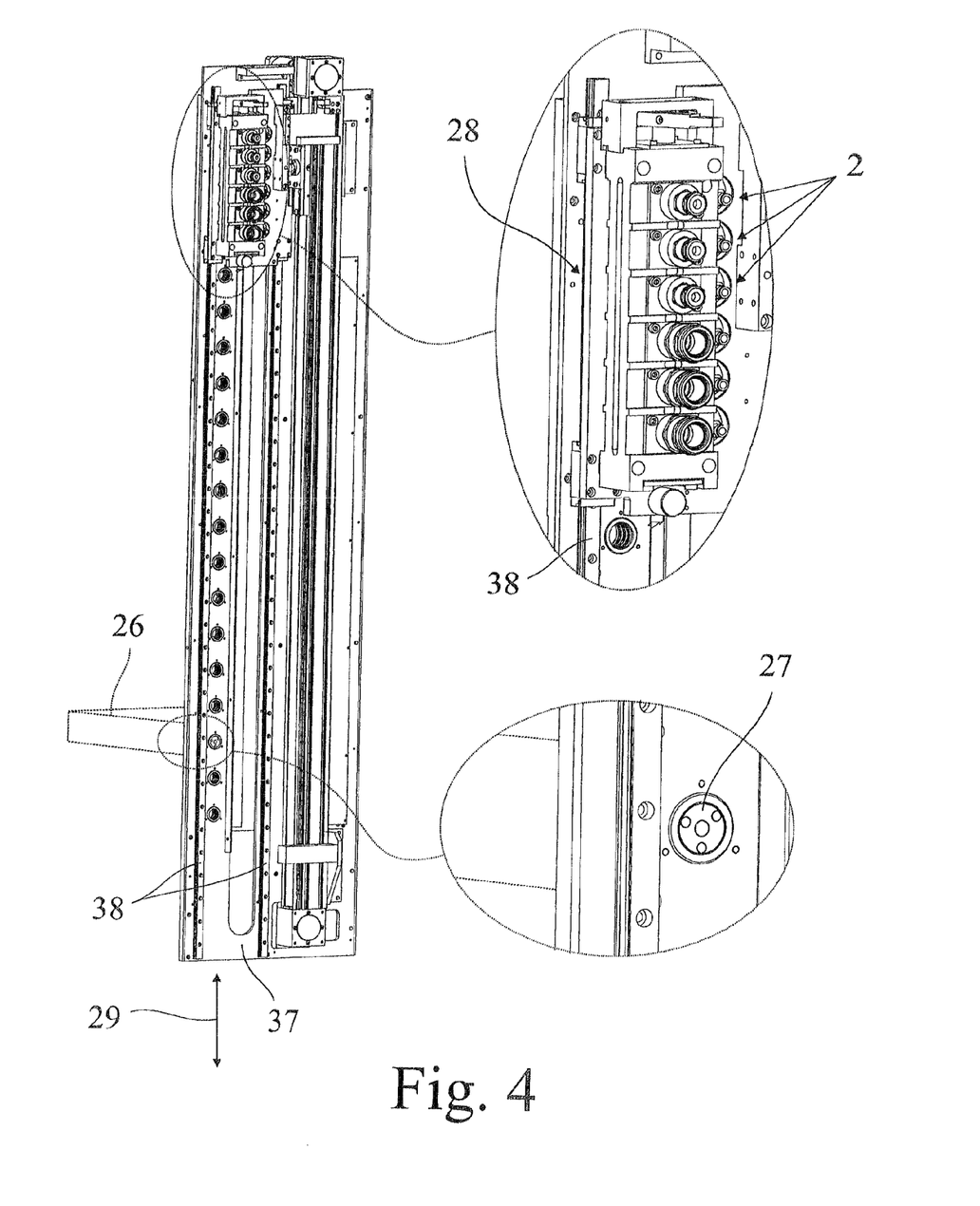
FIG. 4 shows a central supporting plate of the device for providing rivets according to FIG. 1 with transfer carriage installed, in a perspective view.
Figure 5:
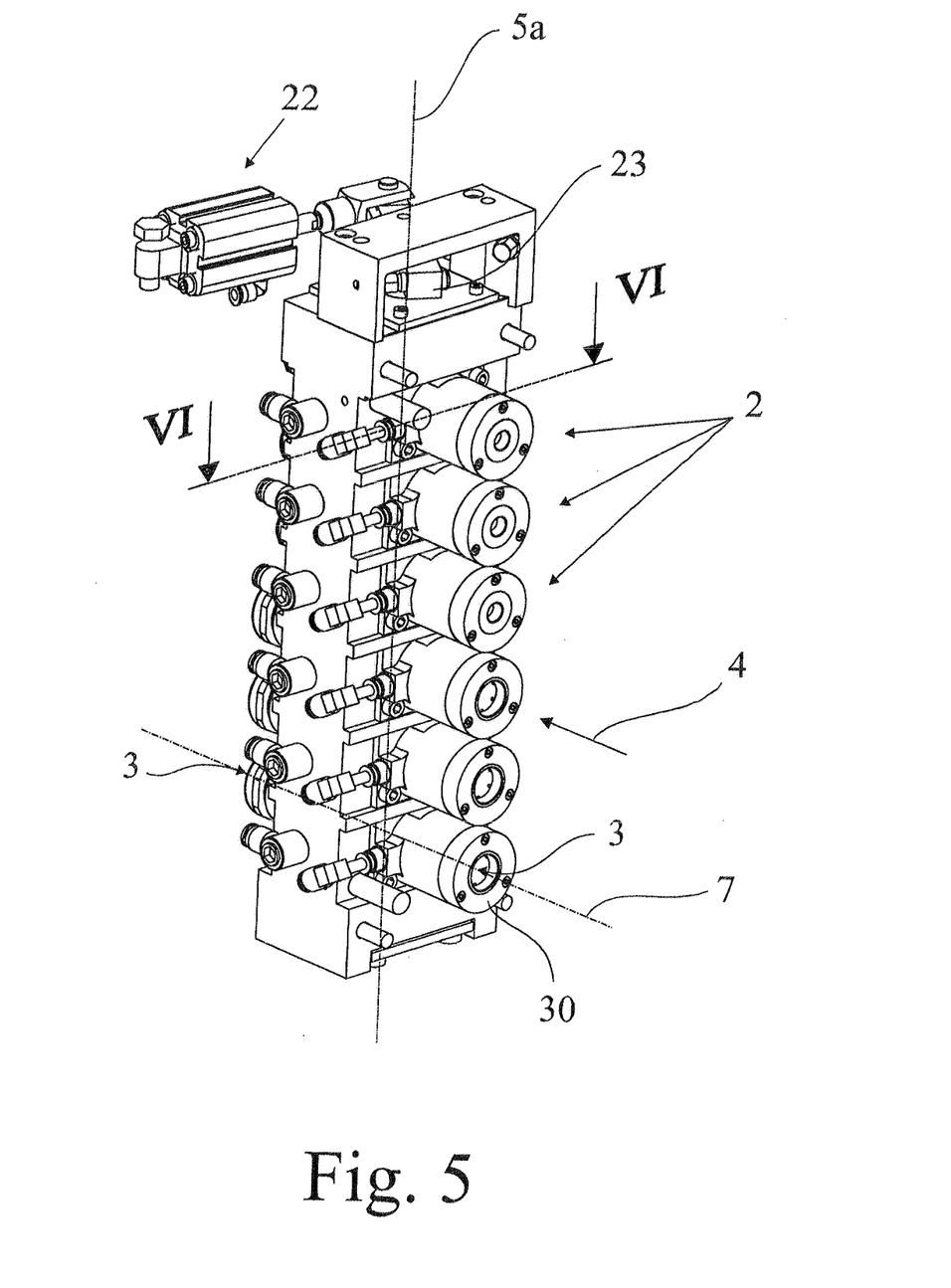
FIG. 5 shows the rivet control of the transfer carriage according to FIG. 4, in a perspective view.
Figure 6:
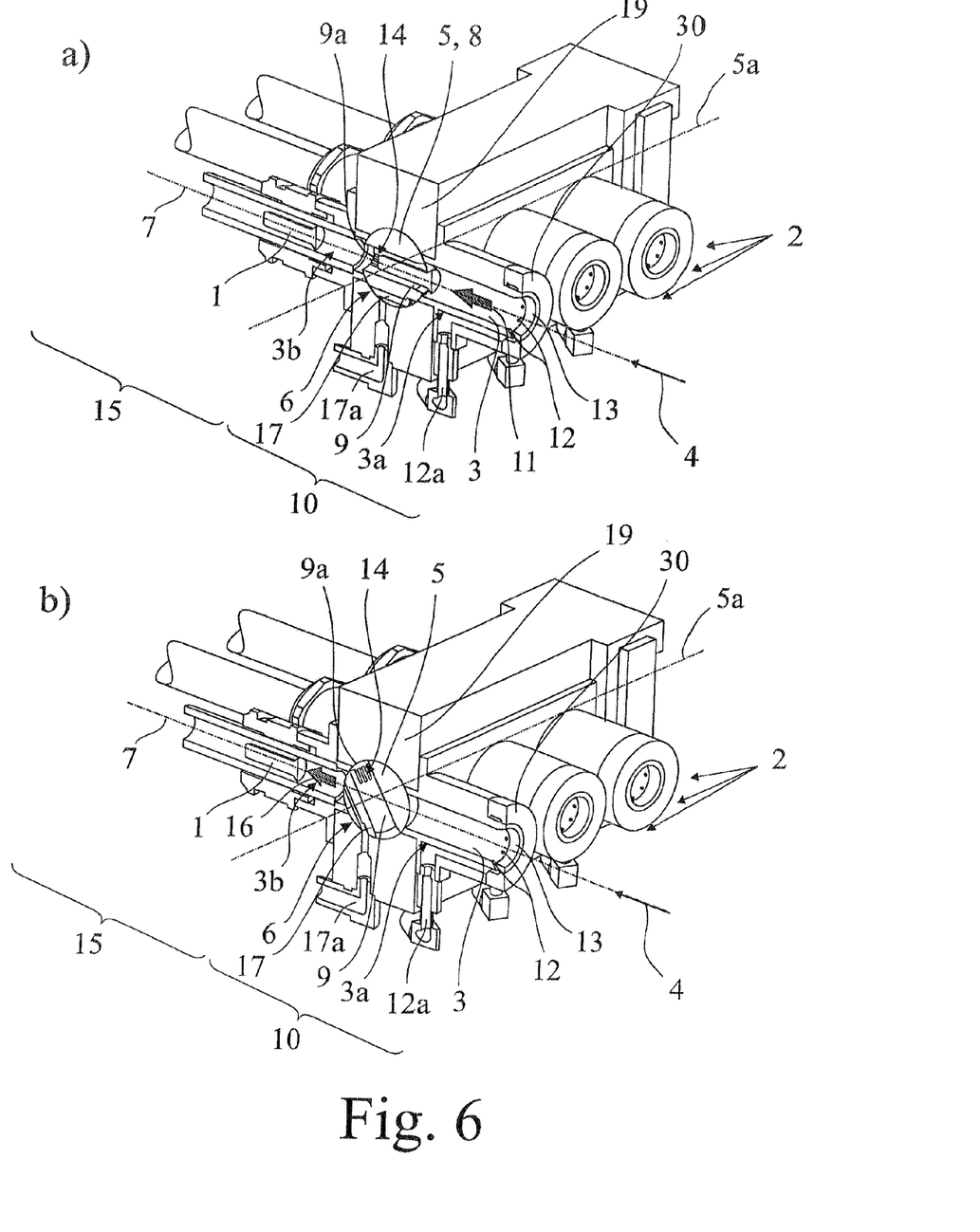
FIG. 6 shows the rivet control according to FIG. 5 in a sectional view along section line VI-VI a) in the pass-through position and b) in the blocking position.
Figure 7:
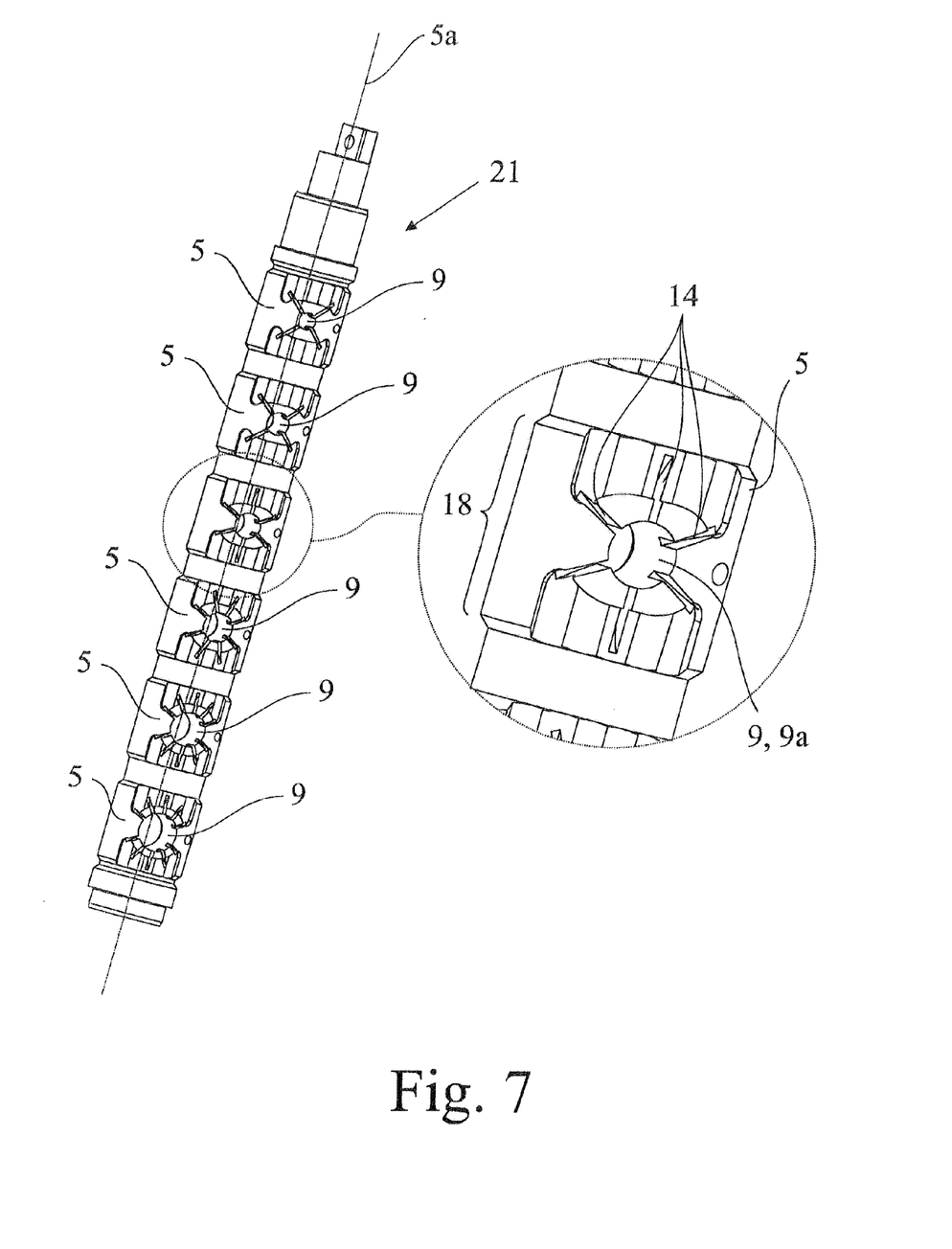
FIG. 7 shows the control shaft of the rivet control according to FIG. 5, in a perspective view.

FIGS. 5 to 7 show a rivet control according to the invention, which is used here and preferably in the device for providing rivets R depicted in FIGS. 1 to 4. The rivet control is basically modular and comprises at least one rivet control unit 2, i.e. a total of six rivet control units 2 in this case. The design of a rivet control unit 2 is shown in the depictions according to FIG. 6. For simplicity, only one rivet control unit 2 is discussed in the following. All embodiments of this rivet control unit 2 apply for all further rivet control units 2 of the rivet control.

In the installed state, the rivet control is connected into the rivet material flow. To this end, each rivet control unit 2 is equipped with a rivet channel 3 through which particular rivet elements 1 can be pushed.

The transport of rivet elements 1 takes place here and preferably via a fluid flow which is introduced into the particular section of rivet channel 3. In the simplest case, the fluid is air.

The rivet channel 3 comprises an inlet section 3 a for receiving rivet elements 1, and an outlet section 3b. Rivet elements 1 therefore travel in conveyance direction 4 from inlet section 3 a to outlet section 3b and, from there, to the particular rivet application.

It is interesting at this point that rivet control unit 2 of the rivet control according to the invention comprises a control shaft 5 which extends through rivet channel 3 in a control region 6 between inlet section 3a and outlet section 3b. Basically, control shaft 5 can extend through only a portion of rivet channel 3. In this case and preferably, however, entire rivet channel 3 is extended through.

Viewing FIGS. 6a and 6b in combination reveals that the passage of rivet elements 1 and/or fluid through control region 6 can be controlled by swiveling control shaft 5. When control shaft 5 is swiveled, this always means swiveling about control shaft axis 5a. At this point it becomes clear that control shaft 5 can also be used to carry out complicated control tasks in a structurally simple manner.

Different variants are feasible for orienting control shaft 5 relative to rivet channel 3. In this case and preferably, control shaft axis 5a is oriented substantially transversely to rivet channel longitudinal axis 7 in inlet section 3a and/or in outlet section 3b. It is preferably provided that control shaft 5 extends through the entire cross section of rivet channel 3, as explained above.

Finally, control shaft 5 functions here in the manner of a shutoff valve. Accordingly, control shaft 5 provides a connection section 8 between inlet section 3a and outlet section 3b, which is open for rivet elements 1 and fluid in the pass-through position depicted in FIG. 6a. In contrast, FIG. 6b shows that control shaft 5, in a blocking position, substantially blocks the passage of rivet elements 1 and/or fluid between inlet section 3a and outlet section 3b.

The wording "substantially blocks" means that blockage does not necessarily have to be complete. In a particularly preferred embodiment it is even provided, however, that, in the blocking position, outlet section 3b at the least is sealed in the direction of inlet section 3a in regard to the passage of fluid, as explained below.

To attain the pass-through position and the blocking position in regard to design, it is provided that control shaft 5 has a rivet channel pass-through bore 9 depicted in FIG. 6, the cross section of which substantially corresponds to the cross section of rivet channel 3 in inlet section 3a and/or in outlet section 3b. Depending on the position of control shaft 5, rivet channel pass-through bore 9 provides above-described connection section 8 between inlet section 3a and outlet section 3b of rivet channel 3, or rivet channel pass-through bore 9 blocks the passage of rivet elements 1 and/or fluid between inlet section 3a and outlet section 3b.

The function of rivet control unit 2 is not limited to the pure function of a shutoff valve, however. Instead, rivet control unit 2 comprises a transfer conveyor device 10 which serves to convey a rivet element 1 from inlet section 3a into outlet section 3b using a transfer fluid flow 11 (FIG. 6a). To this end, transfer conveyance device 10 comprises a plurality of fluid channels 12 which communicate with inlet section 3a of rivet channel 3 and can be created via transfer fluid flow 11. To this end, fluid channels 12 are coupled to a corresponding fluid supply 12a. The direction of transfer fluid flow 11 is determined by the orientation of fluid channels 12, which is shown in the depiction according to FIG. 6.

It has been shown that, in combination with conical opening 13 of inlet section 3a, transfer fluid flow 11 creates an underpressure in the region of conical opening 13 in the manner of the Venturi effect, thereby suctioning in rivet element 1 located in front of opening 13.

A certain fluid volumetric flow rate must be ensured to transport rivet elements 1 effectively. To this end, transfer conveyance device 10 comprises at least one ventilation opening 14 in the region of control shaft 5, via which at least a portion of transfer fluid flow 11 flows out. In a variant that is structurally particularly simple, control shaft 5 comprises a number of ventilation grooves 14 which lead into an outlet opening 9a of rivet channel pass-through bore 9 (FIG. 6, 7).

Furthermore, rivet control unit 2 is equipped with a transport conveyance device 15 for forwarding a rivet element 1 from outlet section 3b to the rivet application using a transport fluid flow 16. Rivet element 1 is transported in the configuration shown in FIG. 6b).

An interesting aspect, which is significant in and of itself in this case, is the fact that transport fluid flow 16 is introduced substantially into the center of outlet section 3b of rivet channel 3 in this case, relative to the cross section of rivet channel 3. Optimal conveyance of rivets is therefore supported without rivet elements 1 tilting.

Specifically, transport conveyance device 15 comprises—in this case and preferably—exactly one fluid channel pass-through bore 17 in control shaft 5, which communicates with outlet section 3b on both sides and with a fluid supply 17a on the other side, when control shaft 5 is in a transport position depicted in FIG. 6b). The transport position of control shaft 5 is therefore obviously identical to the blocking position of control shaft 5. In the pass-through position, fluid channel pass-through bore 17 cannot communicate with fluid supply 17a and/or outlet section 3b.

The explanations provided above clearly show that control shaft 5 advantageously has a plurality of different functions, which results in a highly compact system. An optimal functional structure results overall in that control shaft 5, in the pass-through position, provides a connection section 8 between inlet section 3a and outlet section 3b, which is open for rivet elements 1, and in that control shaft 5, in the blocking position, blocks the passage of rivet elements 1 between inlet section 3a and outlet section 3b and, as mentioned above, permits a transport fluid flow 16 to be introduced substantially into the center of rivet channel 3, in particular into outlet section 3b of rivet channel 3, relative to the cross section of rivet channel 3.

As depicted in FIG. 6b), the position of the outlet opening of fluid channel pass-through bore 17 in outlet section 3b can be easily adjusted via the position of fluid channel pass-through bore 17 in control shaft 5. It is therefore also easy to attain the above-described, central introduction of transport fluid flow 16.

As shown in the depiction presented above, the design of control shaft 5 basically has no limits in regard to implementing different control tasks. In this case and preferably, control shaft 5 comprises a rivet channel pass-through bore 9 which is oriented substantially perpendicularly to control shaft axis 5a, the longitudinal axis thereof extending through control shaft axis 5a. Other orientations are also feasible.

Fluid channel pass-through bore 17 is oriented substantially perpendicularly to control shaft axis 5, wherein the longitudinal axis of pass-through bore 17 is offset relative to control shaft axis 5a. Other variants are also feasible.

In particular, it should be expressly pointed out that additional control lines of any type can be provided in control shaft 5.

In regard to fluid flow, control shaft 5 can provide a different seal in the blocking position, as indicated above. Here, and preferably, control shaft 5 is equipped with a sealing surface 18 which serves as a seal with respect to housing 19 of rivet control unit 2. Sealing surface 18 is interrupted only by ventilation openings 14. It is thereby ensured that, in the blocking position depicted in FIG. 6b), the introduction of transport fluid flow 16 generates a pressure wave in outlet section 3b, which ensures that rivet element 1 is reliably transported to the particular rivet application. In this context, it should be noted that the rivet application is rarely more than 10 meters away from rivet control unit 2, wherein rivet element 1 is transported through tube lines 20 shown in FIG. 2, and so, compared to transfer conveyor device 10, transport conveyance device 15 must transfer a considerable amount of kinetic energy to rivet element 1.

A large number of advantageous variants are feasible for the shape of control shaft 5. For example, control shaft 5 can be substantially spherical in sections, and therefore function in the manner of a ball valve.

FIG. 7 shows that, in the embodiment that is depicted and preferred, a plurality of control shafts 5 have been combined to form one control shaft 21. This accounts for the fact that, in this case, at least two adjacently disposed rivet control units 2, specifically a total of six adjacently disposed rivet control units 2 are provided, wherein control shafts 5 of rivet control units 2 are each provided by an axial section of common control shaft 21. It becomes clear here that only a single actuator 22 is required for all rivet control units 2, which is used to swivel common control shaft 21 using a motor.

In the embodiment which is shown and preferred, actuator 22 is a pneumatic linear drive which is coupled to common control shaft 21 via a drive lever 23 for drive purposes. Other variants of actuator 22 are feasible.

According to a further teaching which is significant in and of itself, a device for providing rivets R depicted in FIGS. 1 to 4, which is equipped with a rivet control discussed above, is claimed.

Figure 2:
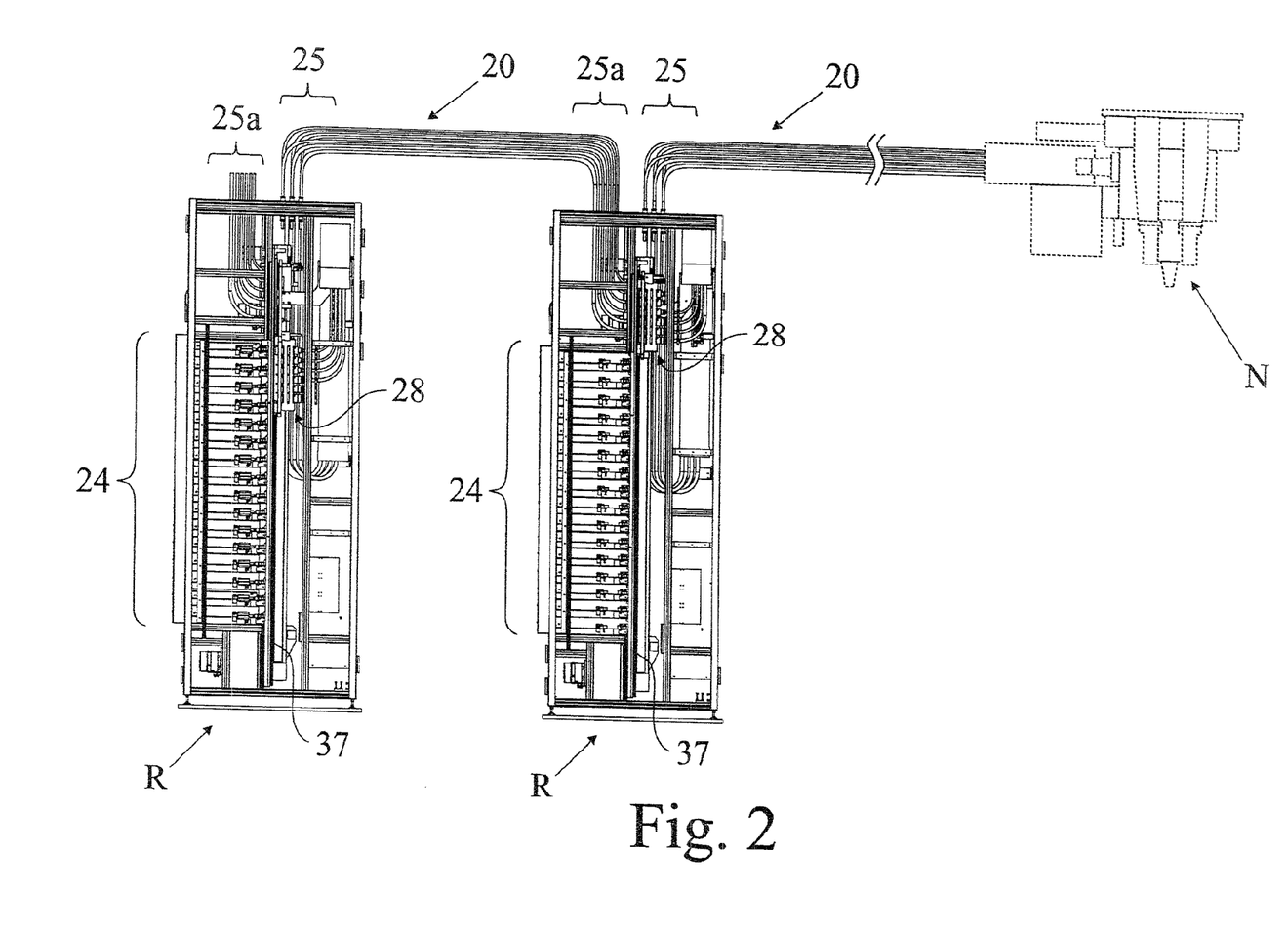
FIG. 2 shows two serially connected devices for providing rivets according to FIG. 1 during operation with one schematically depicted rivet tool, both in a side view.

As explained above, the device for providing rivets R serves to provide rivet elements 1 or the like for at least one rivet application. As indicated in FIG. 2, the rivet application is performed by an automated rivet tool N. FIG. 2 also shows that two devices for providing rivets R are connected in series, as described below.

The device for providing rivets R comprises a rivet storage unit 24 in which preferably different rivet elements 1 can be stored. The device for providing rivets R also comprises at least one rivet outlet 25, i.e. a total of 6 rivet outlets 25 in this case.

In this case, rivet storage unit 24 is equipped, in the manner of a cartridge cabinet, with at least two stacked rivet cartridges 26 which are replaceable, in particular, each of which comprises at least one output flange 27 or the like for dispensing rivet elements 1. Output flange 27 of rivet cartridge 26 can have different configurations. In this case, and preferably, output flange 27 is tubular, as shown in the depiction in FIG. 3 a).

Furthermore, a transfer carriage 28 is provided, which comprises an above-described rivet control comprising a plurality of rivet control units 2 in this case and preferably. Rivet control units 2 are designed to accommodate different rivet elements 1, thereby ensuring that the appropriate rivet control unit 2 is used depending on which rivet element 1 should be transferred.

In order to orient the appropriate rivet control unit 2 to the particular desired rivet cartridge 26, transfer carriage 28 is movable along rivet cartridge 26 in stacking direction 29 thereof. A rivet control unit 2 of the rivet control can therefore be oriented toward a rivet cartridge 26 to transfer a rivet element 1 from particular rivet cartridge 26 to particular rivet control unit 2.

Two positions of transfer carriage 28 are shown in FIG. 2. Output sections 3b of rivet control units 2 are connected to above-described rivet outlets 25. Furthermore, each rivet control unit 2 comprises an input flange 30 assigned to input section 3a of rivet channel 3 to receive rivet elements 1, wherein output flange 27 on the rivet cartridge side and input flange 30 on the rivet control side are separated by a gap when a rivet element 1 is transferred.

A form-fit connection of any type therefore does not occur between the two flanges 27, 30. FIG. 4 shows, in the detailed depiction at the bottom, how output flange 27 on the rivet cartridge side is positioned relative to the rivet control and input flanges 30 located there. Due to the fact that a gap is always present between output flanges 27 on the rivet cartridge side and input flanges 30 on the rivet control side, it is sufficient to move transfer carriage 28 and the rivet control overall with only one degree of freedom. To ensure flawless transfer, it has proven advantageous for the gap to lie in a range between approximately 0.2 mm and approximately 0.6 mm. A gap width of approximately 0.4 mm is particularly preferred in this case.

It has already been mentioned that different rivet cartridges 26 preferably store rivet elements 1 having different dimensions, at least in part, wherein transfer carriage 28 therefore comprises a plurality of rivet control units 2 adapted to the different dimensions. The adaptation of rivet control units 2 mainly relates to the diameter of rivet channel 3 and the related connectors, as shown in the detailed depiction at the top in FIG. 4, for instance.

A transfer of a rivet element 1 from a rivet cartridge 26 is explained in the following as an example.

First, transfer carriage 28 orients one of the rivet control units 2 toward the desired rivet cartridge 26, and so the input flange 30 on the rivet control side is centered on output flange 27 on the rivet cartridge side. A separating device (not depicted) provided in rivet cartridge 26 then releases a single rivet element 1 which passes through the gap between the two flanges 27, 30 and is received by input section 3a of rivet control unit 2. To this end, transfer conveyance device 10 is activated in a timely manner, and so rivet element 1 is drawn into input section 3a via the above-mentioned Venturi effect, and is then conveyed into output section 3b via transfer fluid flow 11. Control shaft 21, which has been situated in the pass-through position until now, is then transferred to the blocking position (transition from FIG. 6a to FIG. 6b). Finally, transport conveyance device 15 is activated, and so rivet element 1 is conveyed further via the build-up of a pressure wave via fluid channel through bore 17 to rivet tool N via tube line 20.

An interesting aspect, which is significant in and of itself, is that the device for providing rivets R is designed such that it can be connected in series to a further device for providing rivets R. This further aspect does not require that a transfer carriage 28 be provided.

The essential aspect is that, in addition to rivet outlet 25, at least one rivet inlet 25a be provided, and that the arrangement be designed such that a rivet element 1 provided at rivet inlet 25a can be passed to rivet outlet 25. One rivet tool N can therefore be supplied with rivet elements 1 by a plurality of devices for providing rivets R without the need to provide any type of conveyance switch between the devices for providing rivets R and rivet tool N.

In a particularly preferred embodiment, the device for providing rivets R is equipped with an above-described transfer carriage 28, wherein transfer carriage 28 can be moved into a pass-through position to transfer a rivet element 1 from a rivet inlet 25a to a rivet outlet 25, thereby enabling a rivet element 1 to be transferred to transfer carriage 28. Of particular significance is the fact that transfer carriage 28 is now used for two purposes, namely to transfer rivet elements 1 from rivet cartridges 26 and to transfer rivet elements 1 that have been provided at rivet inlet 25a.

As shown in the depiction according to FIG. 2, the pass-through position (FIG. 2, right) is different from the transfer position (FIG. 2, left), in which a rivet control unit 2 is oriented toward a rivet cartridge 26 to transfer a rivet element 1 from particular rivet cartridge 26 to particular rivet control unit 2.

A row of pass-through flanges (not depicted) is provided in the region of the pass-through position, which are disposed in a row with output flanges 27 of rivet cartridges 26 and substantially do not differ geometrically from output flanges 27. The pass-through flanges are each connected via a tube segment to a rivet inlet 25a, as shown in FIG. 2. When transfer carriage 28 is situated in the pass-through position, input flanges 30 of rivet control units 2 are oriented toward the pass-through flanges, wherein an above-described gap is preferably provided here as well between the opposing flanges. For the rest, the transfer procedure is largely identical to the procedure described above for transferring rivet elements 1 to rivet cartridges 26:

If the aim, for instance, is to provide a rivet element 1 from a rivet cartridge 26 of the device for providing rivets R, which is shown on the left in FIG. 2, rivet element 1 is transferred from desired rivet cartridge 26 to transfer carriage 28 situated there, and is conveyed further in the direction of rivet outlet 25 situated there. Via tube line 20, rivet element 1 reaches a transfer flange of the device for providing rivets R shown on the right in FIG. 2, passes through the gap there, and reaches inlet section 3a of particular rivet control unit 2. There, the above-described transfer procedure is carried out once more, and so rivet element 1 is conveyed further to rivet tool N.

A further interesting aspect, which is also significant in and of itself, is a very particular manner for fixing rivet cartridges 26—which can be replaced on front side 31 of the device for providing rivets R, inter alia, using a handle 32—in their particular operating positions.

As described above, the device for providing rivets R is used to provide rivet elements 1 from rivet storage unit 24 via at least one rivet outlet 25 for at least one rivet tool N, wherein rivet storage device 24 comprises at least two upper, stacked, replaceable rivet cartridges 26, each of which has at least one output flange 27 or the like for dispensing rivet elements 1.

Figure 1:
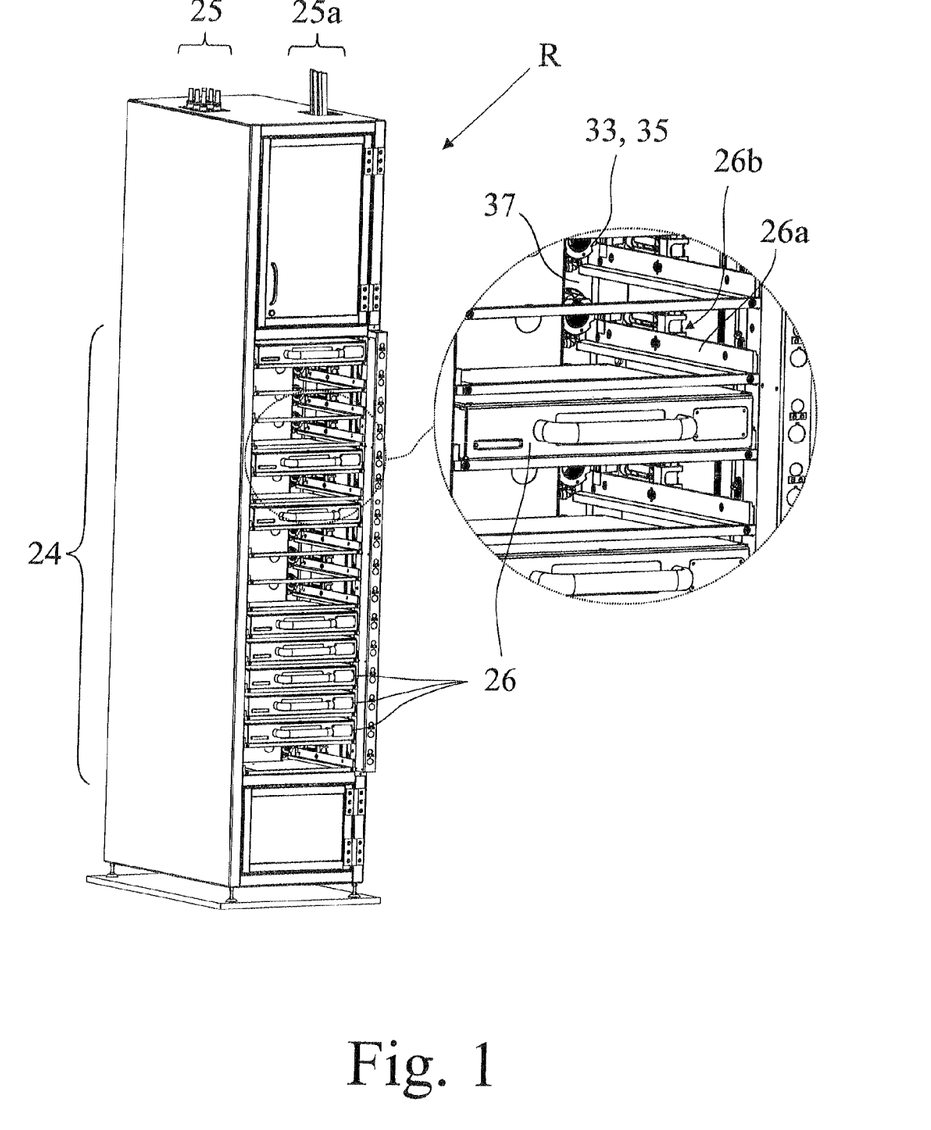
FIG. 1 shows a device for providing rivets according to the invention, in a perspective view at a slant from the front.

A cartridge guide 26a and a releasable cartridge lock 26b are assigned to each rivet cartridge 26, wherein a rivet cartridge 26, for installation thereof, can be slid via cartridge guide 26a to an operating position, where it can be fixed using cartridge lock 26b. Cartridge guide 26a and cartridge lock 26b become clear when FIGS. 1 and 3 are viewed in combination.

It is essential that cartridge lock 26b is assigned to cartridge guide 26a, as shown in the depictions according to FIG. 3, and can be engaged with rivet cartridge 26 for locking.

Cartridge lock 26b therefore rests against cartridge guide 26a which, due to the guidance properties thereof, is designed with minimal tolerances. This forms the prerequisite for attaining the most exact locking position possible (operating position). Given that cartridge lock 26b always assumes a defined position relative to rivet cartridge 26 due to the placement thereof on cartridge guide 26a, it is not necessary to perform complex adjustments of cartridge lock 26b upon installation thereof.

Attaining the exact operating position is particularly significant when the aim is to assign an above-described transfer carriage 28 to rivet cartridges 26. Provided that the above-described configuration should be provided with a gap between rivet cartridge-side output flange 27 and rivet control-side input flange 30, the width of which moves in the 1/10 mm range, attaining the operating position exactly is even necessary to function.

FIGS. 1 and 3 show a particularly simple design of cartridge lock 26b which meets the most stringent accuracy requirements. The reason for this is that cartridge lock 26b presses rivet cartridge 26 in the locked state against a stationary cartridge stop 33, wherein, in this case and preferably, pressing direction 34 corresponds to the sliding-in direction of rivet cartridge 26.

A number of possibilities are feasible for the design of cartridge stop 33. In this case and preferably, stationary cartridge stop 33 is in the form of a mounting flange 35, through which supporting plate 37 of particular rivet cartridge 26 extends at least in part (see FIG. 3a in combination with FIG. 4, detailed depiction at the bottom). In the embodiment shown, which is preferred, output flange 27 of rivet cartridge 26 has been equipped with a circumferential collar 36 which forms a counterstop for mounting flange 35.

The use of output flange 27 of rivet cartridge 26, which is present anyway, is structurally efficient. It is also advantageous in regard to tolerances since mounting flange 25 is a reference position, to a certain extent, relative to the position of transfer carriage 28.

Particularly good results in terms of reducing tolerances can be achieved, as depicted here, by providing a supporting plate 37 on which cartridge guide 26a and cartridge stop 33 or mounting flange 35 are disposed. It is therefore possible, in the locked state, to attain an approximately closed power flow between cartridge guide 26a, cartridge lock 26b, output flange 27 of rivet cartridge 26, cartridge stop 33 and mounting flange 35 and supporting plate 37. When the configuration is suitable, the resulting tolerances in terms of assuming the operating position are correspondingly small.

Given that, in the embodiment which is shown and preferred, the exact positioning of output flange 27 of rivet cartridge 26 relative to transfer carriage 28 is crucial, it is advantageously provided that transfer carriage 28 is also disposed on supporting plate 37. As shown in the depiction according to FIG. 4, transfer carriage 28 moves on two rails 38 which are attached to the side of supporting plate 37 facing away from rivet cartridges 26.

Preferably, cartridge lock 26b can be actuated using a motor. In the simplest case, a linear actuator 39 which is preferably a pneumatic actuator is assigned to cartridge lock 26b. Pneumatic actuator 39 is coupled at one end to cartridge guide 26a, and at the other end to a locking mechanism 40. This is shown clearly in the depictions according to FIG. 3.

Locking mechanism 40 also has a particularly simple design in the embodiment shown. Locking mechanism 40 comprises only one pivotable locking lever 41 which is preferably hingedly connected to cartridge guide 26a. Pivot axis 41a of locking lever 41 extends substantially vertically.

In the unlocked state, locking lever 41 lies outside the range of motion of rivet cartridge 26, thereby enabling rivet cartridge 26 to be easily slid out of cartridge guide 26a. For locking, actuator 39 causes locking bolt 41 to swivel such that a projection 43 of locking lever 41 engages with rivet cartridge 26, i.e. a part of output flange 27 of rivet cartridge 26 in this case. For this engagement, output flange 27 of rivet cartridge 26 is equipped with a further collar 44, as shown in FIG. 3a.

Numerous possibilities are feasible for the position of actuator 39. Depending on the basic structural conditions, it may also be advantageous, for example, to place actuator 39 on the side of supporting plate 37 facing transfer carriage 28.

It will be understood that each of the elements described above, or two or more together, may also find a useful application in other types of constructions differing from the types described above.

While the invention has been illustrated and described as embodied in a device for providing and controlling motion of connection elements it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A device for controlling a motion of connection elements, including a receipt and forwarding of the connection elements, comprising:
at least two connection elements control units arranged adjacent to each other,
wherein each of said connection elements control units has a connection elements channel through which the connection elements are pushable,
wherein the connection elements channel has an inlet section and an outlet section,
wherein the inlet section and the outlet section of the connection elements channel are aligned coaxially,
wherein each of said connection elements control units have a control shaft section, extending through at least a portion of said channel in a control region between said inlet section and said outlet section, and a transport conveyance device for forwarding connection elements from said outlet section to a connection elements application using a transport fluid flow, the transport conveyance device including at least one fluid channel pass-through bore in said control shaft section, which, in a transport position of said control shaft section communicates with said outlet section and with a fluid supply,
wherein each said control shaft section is an axial section of a common control shaft, which is swivelable so as to control a passage of the connection elements, and
wherein the device for controlling further comprises a common actuator for swiveling said common control shaft using a motor assigned to said common control shaft.

2. A device for controlling a motion of connection elements as defined in claim 1, wherein said connection elements control units are configured so that the connection elements are pushable through said connection elements channel driven by a fluid flow, wherein said common control shaft is swivelable so as to control also a passage of a fluid through said control region.

3. A device for controlling a motion of connection elements as defined in claim 1, wherein said control shaft section has an axis which is oriented substantially transversely to an axis of said connection elements channel in a section selected from the group consisting of said inlet section, said outlet section and both.

4. A device for controlling a motion of connection elements as defined in claim 3, wherein said control shaft section extends through an entire cross section of said connection elements channel.

5. A device for controlling a motion of connection elements as defined in claim 3, wherein said control shaft section in a pass-through position provides a connection section between said inlet section and said outlet section, which connection section is open for the connection elements and fluid, and wherein said control shaft section in a blocking position substantially blocks a passage of a component selected from the group consisting of the connection elements, the fluid, and both, between said inlet section and said outlet section.

6. A device for controlling a motion of connection elements as defined in claim 3, wherein said control shaft section has a channel pass-through bore which, depending on a position of said common control shaft, provides a connection section between said inlet section and said outlet section of said channel, or substantially blocks a passage of a component selected from the group consisting of the connection elements, the fluid and both, between said inlet section and said outlet section.

7. A device for controlling a motion of connection elements as defined in claim 1, wherein each said connection elements control unit has a transfer conveyance device for conveying connection elements from said inlet section into said outlet section using a transfer fluid flow.

8. A device for controlling a motion of connection elements as defined in claim 7, wherein said transfer conveyance device has at least one fluid channel which communicates with said connection elements channel and via which a transfer fluid flow is generated.

9. A device for controlling a motion of connection elements as defined in claim 8, wherein said at least one fluid channel communicates with said connection elements channel in said inlet section.

10. A device for controlling a motion of connection elements as defined in claim 8, wherein said transfer conveyance device includes, in a region of said control shaft section, at least one ventilation opening via which a portion of the transfer fluid flow flows out.

11. A device for controlling a motion of connection elements as defined in claim 10, wherein said control shaft section has ventilation grooves which form said at least one ventilation opening and lead into at least one outlet opening of a pass-through bore of said connection elements channel.

12. A device for controlling a motion of connection elements as defined in claim 1, wherein said outlet section of said connection elements channel has a center relative to a cross-section of said connection elements channel, such that the transport fluid flow is introduced substantially into said center.

13. A device for controlling a motion of connection elements as defined in claim 1, wherein said transport position of said control shaft section operates to allow communication between a fluid supply and said outlet section while blocking passage of connection elements between said inlet section and said outlet section.

14. A device for controlling a motion of connection elements as defined in claim 1, wherein said control shaft section in a pass-through position provides a connection section between said inlet section and said outlet section, which is open for the connection elements, and wherein said control shaft section in a blocking position blocks a passage of the connection elements between said inlet section and said outlet section and, relative to a cross-section of said connection elements channel, permits a transport fluid flow introducible substantially into a center of said connection elements channel.

15. A device for controlling a motion of connection elements as defined in claim 14, wherein said control shaft section in said blocking position permits the transport fluid flow introducible into said outlet section of said connection elements channel.

16. A device for providing connection elements, comprising:
a connection elements storage unit providing the connection elements via at least one connection elements outlet for at least one connection element application, said storage unit including at least two stacked connection elements cartridges each having at least one output flange for dispensing the connection elements; and
a transfer carriage including at least one connection elements control that comprises at least two connection elements control units that are arranged adjacent to each other, a connection elements channel with an inlet section and an outlet section through which the connection elements are pushable and a control shaft section extending through at least a portion of said channel in a control region between said inlet section and said outlet section;
wherein said transfer carriage is movable along said connection elements cartridges in a direction to orient at least one of said connection elements control units towards said cartridge to transfer a connection element from a respective one of said connection elements cartridges to a respective one of said connection elements control units;
wherein the control shaft sections are axial sections of a common control shaft,
wherein said common control shaft is swivelable so as to control a passage of the connection elements, and
wherein the at least one connection elements control further comprises a common actuator for swiveling said common control shaft using a motor and assigned to said common control shaft.

17. A device for providing connection elements as defined in claim 16, wherein said stacked connection element cartridges are replaceable.

18. A device for providing connection elements as defined in claim 16, wherein said connection element control units have an input flange assigned to an input section of said a connection elements channel for receiving the connection elements, and when a connection element is transferred, an output flange on a side of said connection elements cartridge and said input flange on a side of said connection elements control are separated by a gap.

19. A device for providing connection elements as defined in claim 18, wherein said gap is within a range substantially between 0.2 and 0.6 mm.

20. A device for providing connection elements as defined in claim 19, wherein said gap is equal to substantially 0.4 mm.

21. A device for providing connection elements as defined in claim 16, wherein said connection elements cartridges are different and they store the connection elements having different dimensions at least in part, and said transfer carriage has a plurality of said connection elements control units adapted to said different dimensions.

* * * * *